United States Patent [19]
Parker

[11] 3,785,008
[45] Jan. 15, 1974

[54] FISH SCALER

[76] Inventor: Amelia Mary Parker, 16 Memorial Dr., Pittsfield, Mass. 01201

[22] Filed: Dec. 13, 1971

[21] Appl. No.: 207,392

[52] U.S. Cl. .................................................. 17/70
[51] Int. Cl. ......................................... A22c 25/00
[58] Field of Search .................... 17/70, 11, 64, 66, 17/69

[56] References Cited
UNITED STATES PATENTS

| | | | |
|---|---|---|---|
| 1,438,091 | 12/1922 | Bowe | 17/70 |
| 1,837,535 | 12/1931 | Duffey et al. | 17/11 |
| 3,503,094 | 3/1970 | Kennedy | 17/70 |

Primary Examiner—Robert Peshock
Attorney—Dean S. Edmonds et al.

[57] ABSTRACT

A collapsible fish scaler having a base support plate to which a scaling board having a roughened surface is collapsibly attached. The scaling board has a tail end with a clamp rotatably attached thereto for holding the tail of the fish. The head portion of the scaling board includes a rail extension which defines an aperture about which a container, such as a plastic bag, is attached so that the scales of the fish can drop into the bag during the scaling process. A pair of wire supports are rotatably secured to the bottom of the scaling board and to the top of the base plate with at least one wire support having its respective ends aligned in parallel and positioned under the wing portions of a wing nut when the scaling board is in position for scaling. The wing portions of the nut restrain the movement of the wire supports. When the scaling board is to be stored, the wing nut is rotated approximately 90° to free the ends of the wire supports thereby permitting the wire supports to rotate downwardly toward the base support. The scaling board therefore collapses onto the top of the support board for compact storage.

8 Claims, 6 Drawing Figures

PATENTED JAN 15 1974

3,785,008

INVENTOR
Amelia Mary Parker

BY
ATTORNEYS

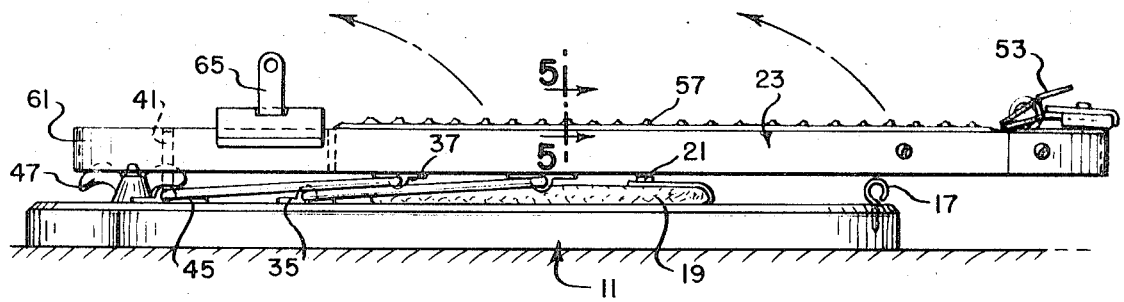
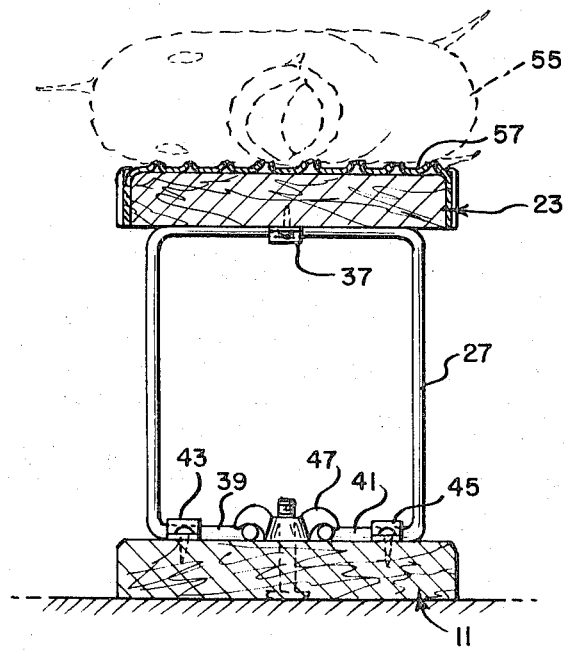
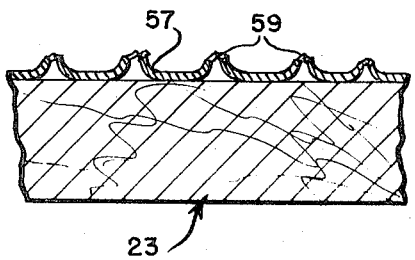
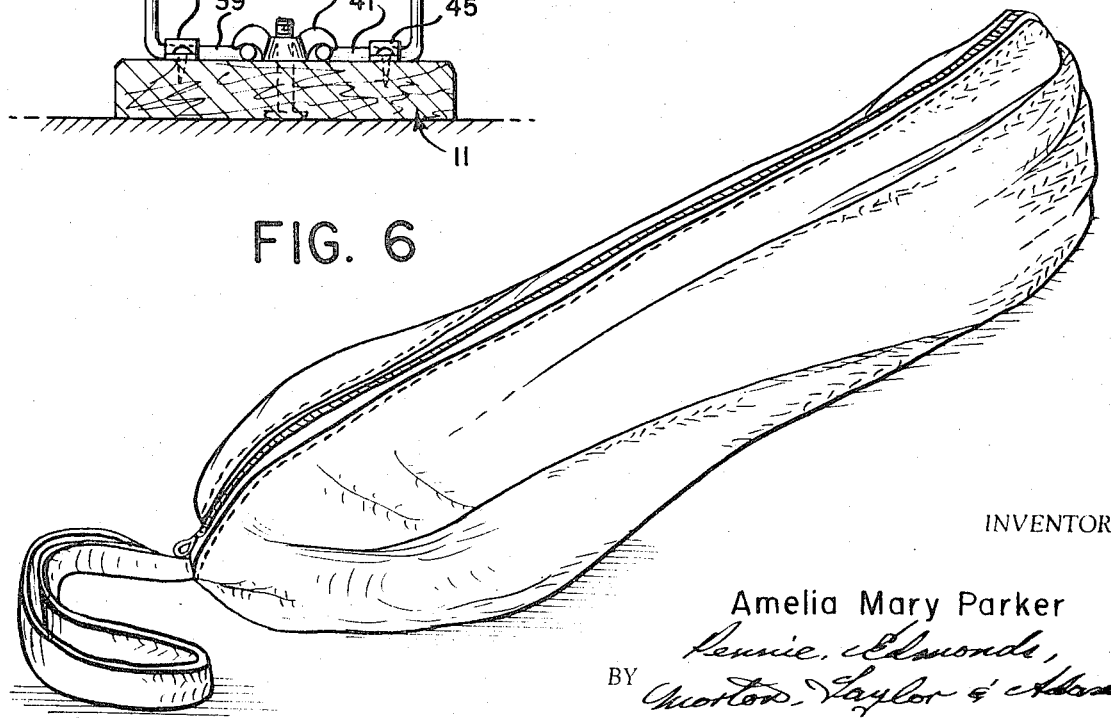
INVENTOR
Amelia Mary Parker

FISH SCALER

BACKGROUND OF THE INVENTION

This invention relates to a collapsible fish scaler.

Fish cleaning is a tedious and laborious task. Fish by their very nature are ordinarily covered with scales and a layer of slime so, at the very outset, a fish is exceedingly difficult to grasp or hold. As the cleaning operation progresses, deposits of scale and slime cover the hands of the person cleaning the fish thereby adding substantially to the difficulties of handling the fish during the scaling process. It is also difficult once the person's hands become covered with scales and slime to maintain a secure grasp of the knives, scalers, and other fish cleaning equipment utilized during the fish cleaning process thereby creating a situation in which the fish cleaner might possibly injure himself with a sharp projection of one of the cleaning tools.

In the past, known fish scaler devices have typically been comprised of a board of some form with a clamp for securing the tail of the fish. The problem with these devices is that the fish is free to slide laterally across the surface of the board even though the longitudinal movement of the fish is restricted by the clamp. There have been other very elaborate fish scaling devices that have restricted the lateral movement of the fish such as described in U.S. Pat. No. 1,438,091 issued to D. E. Bowe and U.S. Pat. No. 1,632,194 issued to H. C. Possehl. The scaler disclosed in the Bowe patent includes a head retaining cup into which the head of the fish is placed. However, because of the configuration of the head holder, fish scaling equipment routinely strike the head holder during the process of scaling the fish thereby dulling or even ruining the fish scaler equipment. The fish cleaning device shown in the Possehl patent utilizes a fish hook which is inserted in the fish's mouth while the other end of the hook is connected to the scaling board. This device, however, requires securing the hook in the mouth of each fish to be scaled thereby increasing the time and labor involved in scaling fish. Accordingly, there is a need for an adequate means for securing a fish to a scaling board to inhibit or limit the lateral movement of the fish with respect to the board.

Further, prior art devices provided no readily available means for catching the slime and scales cleaned from the fish during the scaling process. Consequently, the scaling operation produced not only a hygenically hazardous environment but also one that was unpleasing to the sense of smell.

It therefore is an object of this invention to provide a fish scaler having a means for inhibiting the movement of the fish thereon.

It is another object of this invention to provide a fish scaler having a means for collecting the waste materials scaled from the fish.

It is still another object of this invention to provide a compact and portable fish scaler.

SHORT STATEMENT OF THE INVENTION

Accordingly, this invention relates to a collapsible fish scaler having a base support plate to which a scaling board having a roughened surface is collapsibly attached. The scaling board has a tail end with a clamp rotatably attached thereto for holding the tail of the fish. The head portion of the scaling board includes a rail extension which defines an aperture about which a container, such as a plastic bag, is attached so that the scales of the fish can drop into the bag during the scaling process. A pair of wire supports are rotatably secured to the bottom of the scaling board and to the top of the base plate with at least one wire support having its respective ends aligned in parallel and positioned under the wing portions of a wing nut when the scaling board is in position for scaling. The wing portions of the nut restrain the movement of the wire supports. When the scaling board is to be stored, the wing nut is rotated approximately 90° to free the ends of the wire supports thereby permitting the wire supports to rotate downwardly toward the base support. The scaling board therefore collapses onto the top of the support board for compact storage.

BRIEF DESCRIPTION OF THE DRAWINGS

Other objects, advantages and features of this invention will be more fully apparent from the following detailed description, appended claims and the accompanying drawings in which:

FIG. 3 is a side elevation view of the fish scaler of this invention shown in the collapsed position for storage;

FIG. 4 is an end view of the fish scaler of this invention;

FIG. 5 is a partial cut-away view taken along the lines 5—5 of FIG. 3 and shows the roughened surface of the scaler board;

FIG. 6 shows the fish scaler in this invention being stored in a transport bag.

DETAILED DESCRIPTION OF THE PREFERRED EMBODIMENT

Figure 1:
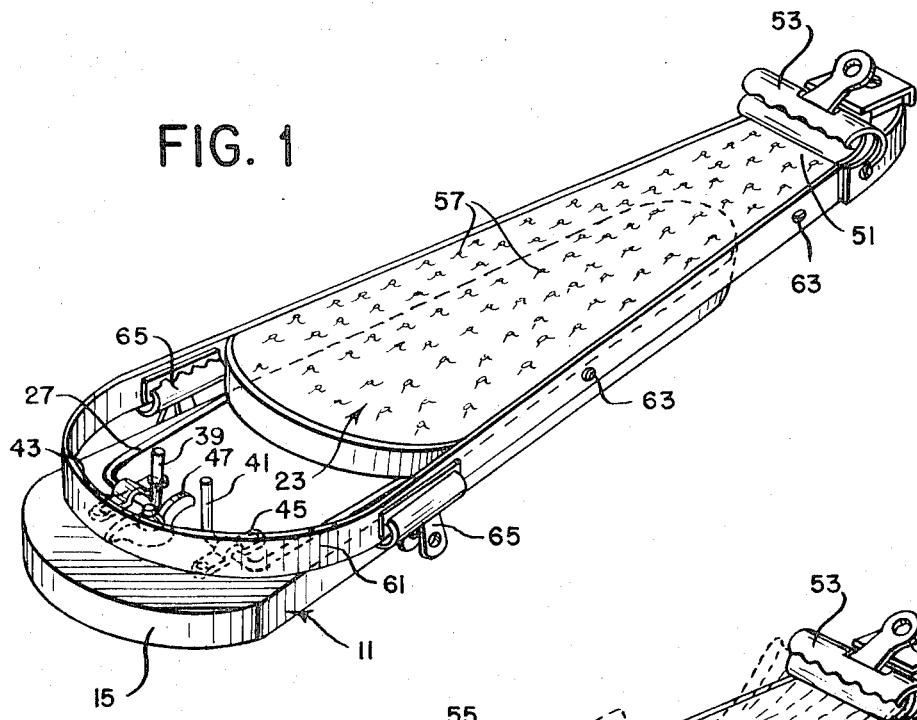
FIG. 1 is a perspective view of the fish scaler of this invention when in the collapsed storage position.
Figure 2:
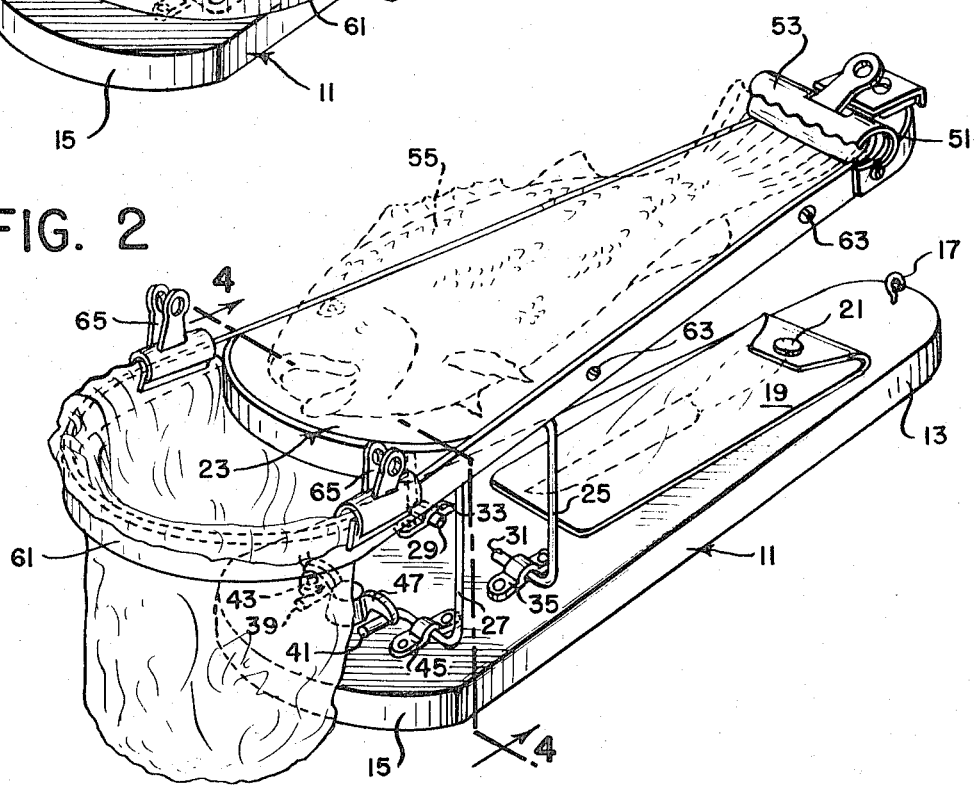
FIG. 2 is a perspective view of the fish scaler of this invention when in the operative position and includes a phantom illustration of a fish mounted thereon.

Referring to FIGS. 1–4, the fish scaler is shown with a base support plate or board 11 having a generally elongated shape and having a tail portion 13 thereof being narrower than the head portion 15. An eye screw 17 is secured to the narrow end of the base board 11 so that the scaler can be hung from a wall when not in use. Also secured to the base board 11 by any suitable means is a tool jacket 19 which carries the various scaling tools utilized in scaling fish. The jacket 19 includes a snap 21 on the lid portion thereof for securing the tools in the jacket when not in use. A scaling board 23 is mounted for collapsible movement with respect to the base plate 11 by means of a pair of wire supports 25 and 27. Support 25 is secured to the underside of scaling board 23 by means of a flange (not shown) which permits rotation of the wire support with respect to the scaling board. The free ends 29 and 31 of support 25 are bent inwardly toward each other in axial alignment to form a pair of fingers and are pivotally journaled within flanges 33 and 35 respectively. Wire support 27 is secured to scaling board 23 by means of a flange 37, as shown in FIG. 4, and is pivotally journaled thereby for rotation with respect to the scaling board. The ends 39 and 41 of wire support 27 are formed so that a portion proximate the ends thereof are in axial alignment in the plane of the base support plate 11. These portions of the wire support 27 are pivotally journaled within flanges 43 and 45. The end portions of the wire 27 are formed parallel to each other as shown. A wing nut 47 is provided for locking the position of the scaling board in an operative or scaling position, as shown in FIGS. 2 and 4, when supports 27 are rotated upwardly so that the free ends 39 and 41 of the wire are locked under the wings of nut 47. When wing nut 47 is rotated approximately 90°, wire support 27 is released thereby permitting the scaling board 23 to collapse onto base board 11. In operation, when it is desired to scale a fish, the scaling board is simply lifted and rotated with respect to the base plate 11, as shown by the dotted lines in FIG. 3, and the wing nut is rotated to secure support wire 27 in place.

The tail end 51 of the scaling board 23 has a clamp 53 rotatably secured thereto by any suitable means. The clamp 53 which is spring biased closed, is capable of swinging laterally to and fro thereby permitting a lateral movement of the fish 55 with respect to the board 23.

In order to inhibit the movement of the fish with respect to the board 23, a roughened surface 57 is provided. The roughened surface 57 may be comprised of any suitable material such as plastic, wood, or metal but which in the preferred embodiment is a sheet of aluminum having a plurality of protrusions therein.

Refer now to FIG. 5 which shows a partial cut-away view of the scaling board 23 taken along the lines 5—5 of FIG. 3. The scaling board 23 is shown having the roughened surface 57 secured thereto by a suitable means such as by glue or by nails. A plurality of protrusions 59 are shown which extend upwardly and away from scaling board 23 and serve to restrain lateral movement of the fish with respect to the scaling board 23.

Referring back to FIGS. 1—4, the head end of the scaling board has a rail 61 extending thereabout which defines an opening about which a container, such as a plastic bag, may be secured. The rail may be of any suitable material such as plastic or wire but in the preferred embodiment is a strip of aluminum which is secured to the sides of the scaling board by means of screws 63. The plastic bag is secured in place by a pair of clamps 65 and the vise formed by the merging surfaces of the rail and the scaling board 23. As the fish 55 is being scaled, the scales and slime from the fish are scraped toward the opening at the head of the scaling board where they fall into the plastic bag.

When the fish scaling operation is completed, wing nut 47 is rotated and the board 23 is collapsed onto base plate 11 by rotating the board downward toward the plate 11. The clips 65 for securing the bag are inverted as shown in FIG. 1 and the entire instrument may be placed in a suitable transport bag such as shown in FIG. 6, thereby providing an easy means for transporting the fish scaler from place to place.

While the invention has been described with respect to a preferred embodiment, it should be understood that there are other embodiments that come within the spirit and scope of the invention as defined by the appended claims.

I claim:
1. A fish scaler comprising:
a. an elongated scaling board having head and tail portions, said scaling board having a roughened surface for retarding the movement of said fish being scaled with respect to the scaling board,
b. a rail secured about the head portion of said scaling board, said rail and said scaling board defining an opening through which the scales and waste from said fish pass,
c. collecting means for collecting the scales and waste passing through said opening, and
d. securing means for releasably securing said collecting means to said rail and scaling board.

2. The fish scaler of claim 1 wherein:
a. said rail comprises a strip of material secured to the side edges of the scaling board and extending beyond the head portion thereof in a closed loop of generally circular configuration.

3. The fish scaler of claim 2 wherein:
a. said collecting means includes a flexible bag disposed within said opening and having its open end draped over said rail; and
b. said securing means includes a plurality of clamps for attaching the open edge of said bag to said rail.

4. The fish scaler of claim 1 further comprising:
a. an elongated base plate attached to said scaling board, and
b. means for supporting said scaling board with respect to said base plate in a first raised position during the scaling process and in a second collapsed position when said scaler is being stored.

5. The fish scaler of claim 4 further comprising:
a. a clamp secured to the tail portion of said board for retaining the tail of said fish.

6. A fish scaler comprising:
a. an elongated base plate,
b. an elongated scaling board attached to said base plate having head and tail portions, said scaling board having a roughened surface for retarding the movement of said fish being scaled with respect to the scaling board,
c. a clamp secured to the tail portion of said board for retaining the tail of said fish,
d. a rail secured about the head portion of said scaling board, said rail and said scaling board defining an opening through which the scales and waste from said fish pass,
e. collecting means for collecting the scales and waste passing through said opening,
f. securing means for releasably securing said collecting means to said rail and scaling board, and
g. means for supporting said scaling board with respect to said base plate in a first raised position during the scaling process and in a second collapsed position when said scaler is being stored.

7. The fish scaler of claim 6 wherein:
a. said support means comprises a pair of wire supports having leg portions in parallel alignment and being rotatably secured to said base and said scaling board, and
b. at least one of said support means being releasably secured to said base plate thereby preventing relative movement of said supports and said scaling board with respect to said base plate.

8. The fish scaler of claim 7 further comprising:
a. a tool holder secured to said base plate for storing the tools utilized during the scaling of said fish.

* * * * *